United States Patent [19]
Schmidt

[11] Patent Number: 4,729,716
[45] Date of Patent: Mar. 8, 1988

[54] WIND TURBINE

[75] Inventor: Guenter E. Schmidt, Napa, Calif.

[73] Assignee: Montana Wind Turbine, Inc., Palo Alto, Calif.

[21] Appl. No.: 833,369

[22] Filed: Feb. 25, 1986

[51] Int. Cl.$^4$ .............................................. F03D 11/04
[52] U.S. Cl. ...................................... 416/10; 416/142; 416/189; 416/240
[58] Field of Search ................. 416/10, 189 A, 196 A, 416/240 A, DIG. 6, 142 B, 11, 143

[56] References Cited

U.S. PATENT DOCUMENTS

| 282,122 | 7/1883 | Schramm | 416/DIG. 6 |
|---|---|---|---|
| 548,171 | 10/1885 | Atwood | 416/189 A |
| 677,747 | 7/1901 | Sterzing | 416/196 A |
| 789,497 | 5/1905 | Johnson | 416/10 |
| 835,667 | 11/1906 | Donnelly | |
| 980,172 | 12/1910 | Brett | |
| 1,015,416 | 1/1912 | Bennett | 416/10 X |
| 1,183,219 | 5/1916 | Manikowske | |
| 1,334,485 | 3/1920 | Clipfell et al. | 416/189 A X |
| 1,417,000 | 5/1922 | Vogt et al. | |
| 1,483,301 | 2/1924 | Halkias | |
| 1,713,866 | 5/1929 | D'Asseler | |
| 2,197,654 | 4/1940 | Beaudry | 114/107 |
| 2,243,156 | 5/1941 | Howe et al. | 60/97 |
| 4,061,101 | 12/1977 | Cook | 114/106 |
| 4,110,631 | 8/1978 | Salter | 416/189 A X |
| 4,122,793 | 10/1978 | Molz | 114/106 |
| 4,213,734 | 7/1980 | Lagg | 416/189 A X |
| 4,319,865 | 3/1982 | Richard | 416/196 A X |
| 4,330,714 | 5/1982 | Smith | 416/189 A X |
| 4,350,895 | 9/1982 | Cook | 290/55 |
| 4,417,853 | 11/1983 | Cook | 416/132 B |
| 4,435,125 | 3/1984 | Cook | 416/132 B |

FOREIGN PATENT DOCUMENTS

| 211360 | 11/1954 | Australia | 416/189 A |
|---|---|---|---|
| EP83819 | 7/1983 | European Pat. off. | 416/13 |
| 371459 | 3/1923 | Fed. Rep. of Germany | 416/189 A |
| 380624 | 9/1923 | Fed. Rep. of Germany | 416/10 |
| 629414 | 4/1936 | Fed. Rep. of Germany | 416/194 A |
| 2642570 | 3/1978 | Fed. Rep. of Germany | 416/240 A |
| 3201199 | 7/1983 | Fed. Rep. of Germany | 416/189 A |
| 3210405 | 9/1983 | Fed. Rep. of Germany | 416/132 B |
| 1036341 | 7/1933 | France | 416/189 A |
| 2067247 | 7/1981 | United Kingdom | 416/10 |
| 2098668 | 11/1982 | United Kingdom | 416/DIG. 6 |
| 2123487 | 2/1984 | United Kingdom | 416/189 A |

Primary Examiner—Everette A. Powell, Jr.
Attorney, Agent, or Firm—Cushman, Darby & Cushman

[57] ABSTRACT

The disclosed wind turbine has a circular turbine wheel with a plurality of soft, furlable and unfurlable airfoils depending between a rim and hub. Each airfoil has associated with it a stepping motor for selectively furling and unfurling the airfoils. The turbine wheel is supported on a carriage which is in turn supported in a cantilevered manner from a central anchor which allows for revolving of the carriage, and therefore the turbine wheel, about the anchor. Control is provided for rotating the turbine wheel into a position upwind and normal to the wind direction. An upstanding pylon mounted on the anchor maintains the turbine wheel in an upright position. The pylon allows for revolving and rotating of the turbine wheel. It also provides for pivoting of the turbine wheel about a generally horizontal axis parallel to and spaced from the plane of the turbine wheel. A plurality of generators are driven by power take-off wheels mounted on the carriage which directly support the turbine wheel rim. Turbine wheel rotational speed control is maintained by varying the number of generators driven by the power take-off wheels and by furling and unfurling the airfoils.

16 Claims, 7 Drawing Figures

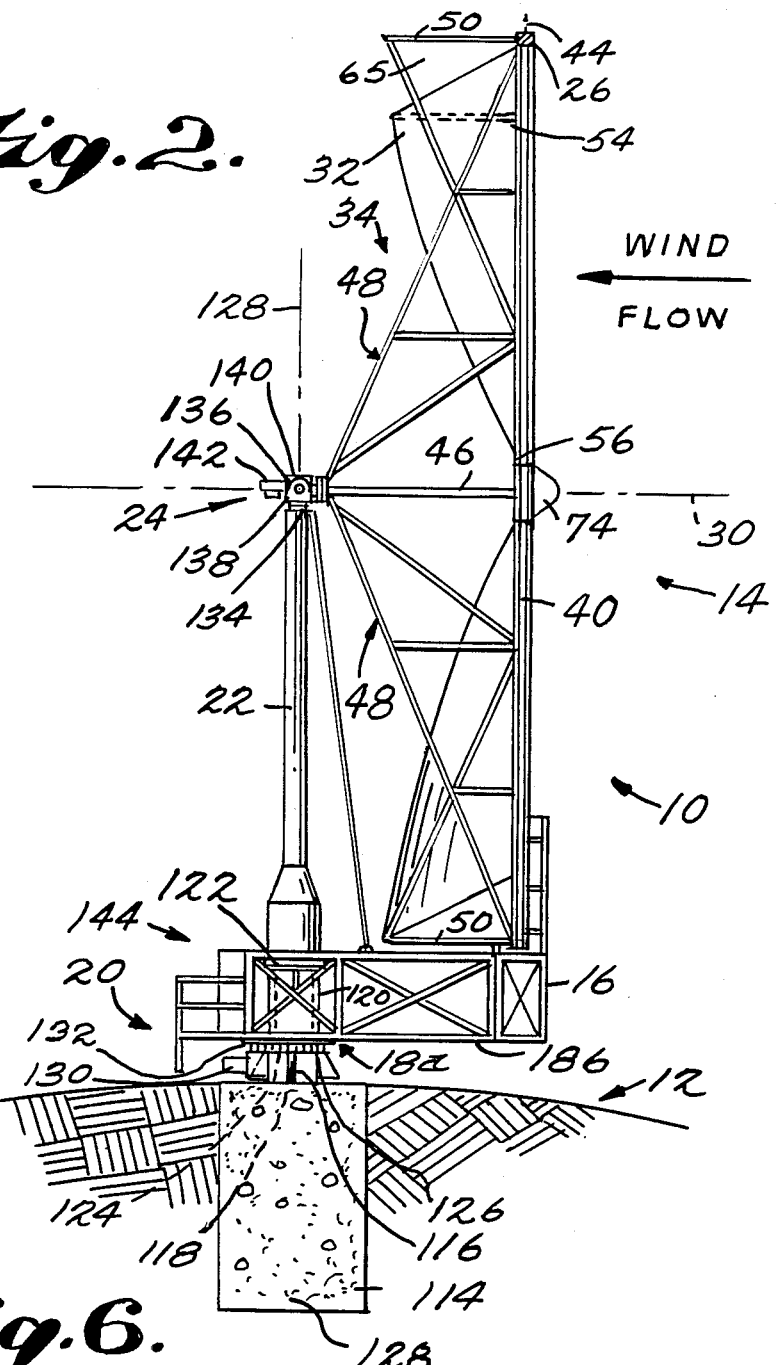
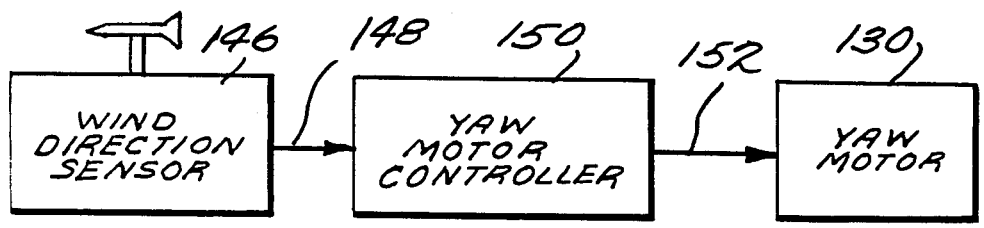

WIND TURBINE

BACKGROUND AND SUMMARY OF THE INVENTION

This invention pertains to wind turbines, and more particularly, to wind turbines having a turbine wheel containing a plurality of airfoils which is mounted for revolution on a cantilevered carriage.

Many types of wind-powered generators have been developed in order to provide a source of energy which does not use expendable or radioactive natural resources. These generally are in the form of wind turbines. One wind turbine design which has been developed includes a large turbine wheel having a generally circular rim with airfoils distributed circumferentially about a hub internally of the rim. The wheel is generally supported by an axle extending through the hub, which axle is then supported relative to a foundation. Power is taken off of such wheels by various means such as a generator the rotating axle, by a belt which extends around the turbine rim and a pulley connected to a generator, or by a rack mounted on the rim which drives a pinion connected to a generator. Alternatively, the wheel may be supported on one or more power take-off wheels connected to generators.

In this latter design, the power take-off wheels are mounted on a carriage which rides on a circular track extending around a central structure connected to the hub of the turbine wheel. In order to keep such turbine wheels stable on the carriage, one known method is to provide extended axles projecting axially from the hub with guy wires connected to the wheel near the rim. These devices are usually freely riding on the circular rail so that the wind forces them to align downwind from the center pivot.

It can be seen that in order to install such a device, an elaborate foundation must be provided to support the carriage track so that it is substantially horizontally disposed and circular. The topographical locations which are suitable for its installation are very limited. Further, when suitable areas are available, each wind turbine installation occupies a substantial amount of area. Further, some inefficiencies result in such systems by the wind shadow that results from having the center pivot structure upwind from the turbine during operation.

The present invention provides a carriage-supported wind turbine wheel which avoids the above disadvantages. In particular, it provides a wind turbine which does not require the use of a track for the carriage to ride on and does not require the use of extended axles with guy wires for maintaining the turbine wheel in an upright position.

These and other advantages are obtained in a wind turbine made according to the present invention which includes a cantilevered support for a carriage on which the turbine wheel rides. The carriage is cantilevered from a centrally disposed anchoring assembly which, in a preferred embodiment, is disposed along an axis of revolution of the carriage. Thus, only a central foundation is required for supporting the entire wind turbine. Further, a driver positions the wind turbine wheel upwind from the central anchoring assembly, with no structural supports upwind of the wind turbine wheel, so that the airfoils of the wheel receive the direct impact of the wind. Further, the wheel is held in a stable position on the carriage by a short axle and a truss system which also supports the airfoils. The axle is connected to a pylon in a manner allowing rotation and revolution of the turbine wheel. Further, the axle and wheel pivot about an axis which is generally parallel to the plane of the wheel, thereby allowing essentially the full weight of the wheel to be supported on the carriage.

These and additional features and advantages of the present invention will be more clearly understood from a description of the drawings and a detailed description of the preferred embodiment.

BRIEF DESCRIPTION OF THE DRAWINGS

With reference to the accompanying four sheets of drawings:

FIG. 2 is a side view of the wind turbine of FIG. 1 showing only a portion of the airfoils and support truss system for clarification;

FIG. 6 is a block diagram showing a system for controlling the orientation of the wind turbine wheel of FIG. 1.

DETAILED DESCRIPTION OF THE PREFERRED EMBODIMENT

Figure 3:
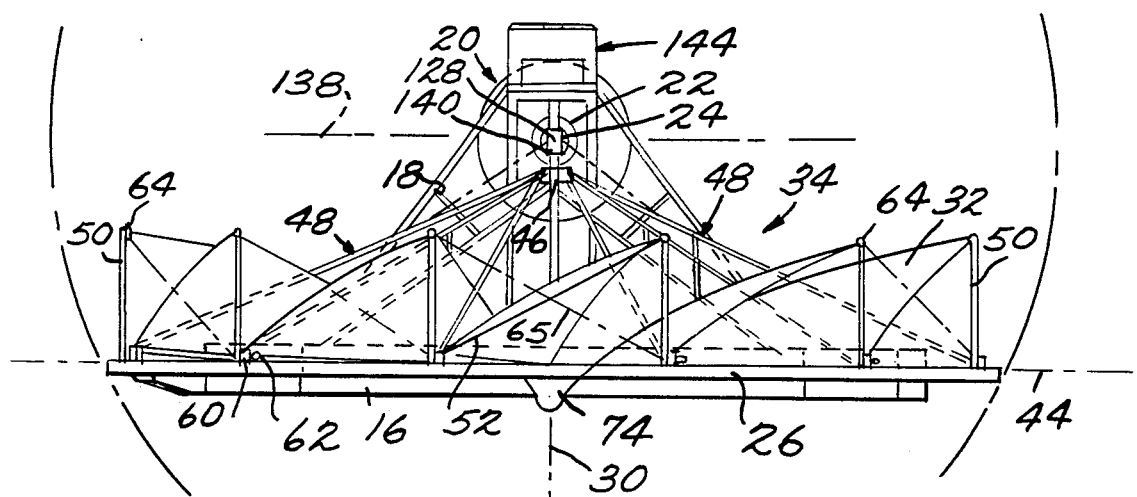
FIG. 3 is a top view of the wind turbine of FIG. 1.
Figure 1:
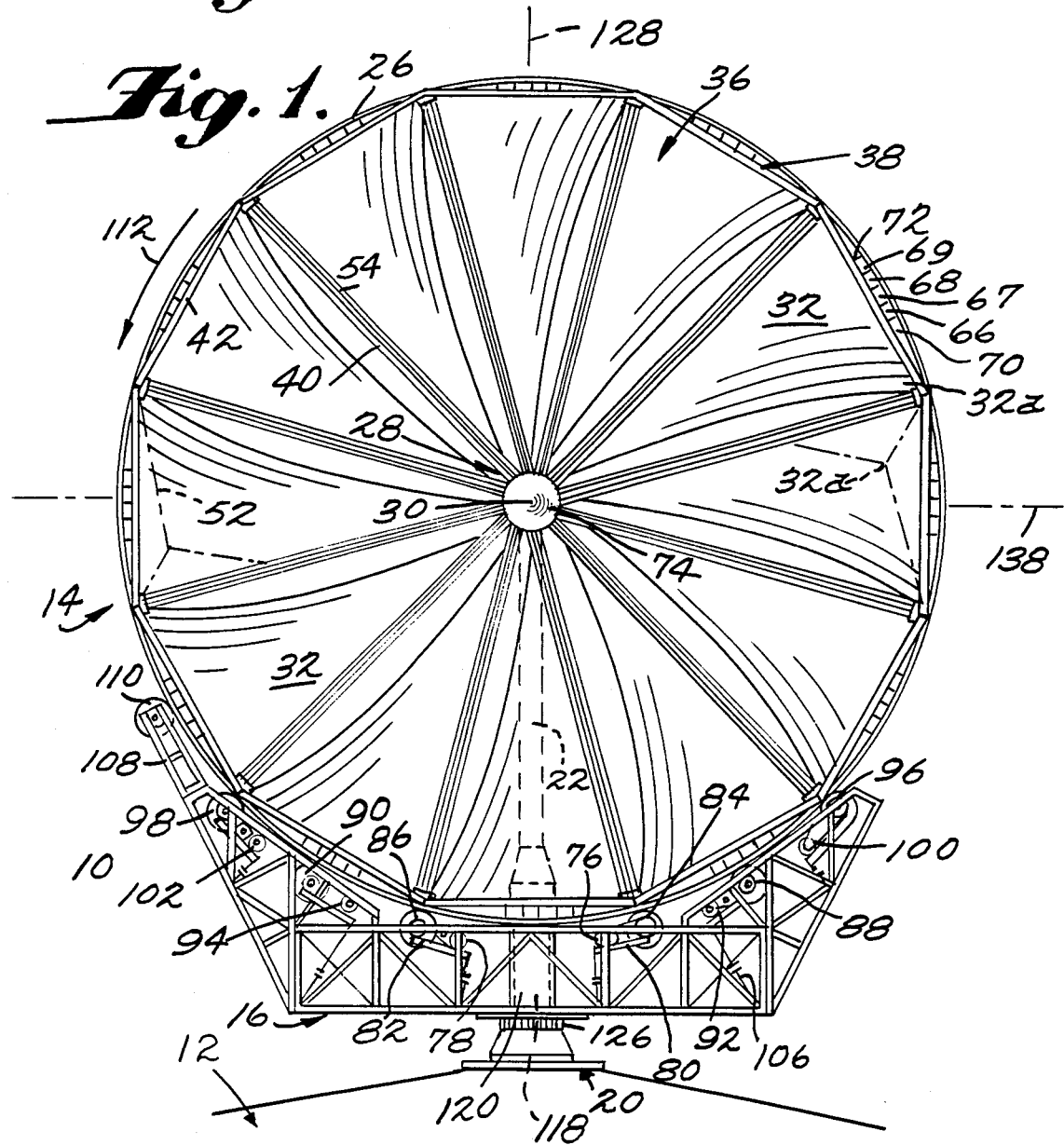
FIG. 1 is an elevational view of the front of a wind turbine made according to the present invention.

Referring initially to FIGS. 1-3, a wind turbine 10 made according to the present invention is shown constructed on the knoll of a hill 12. Wind turbine 10 includes a circular turbine wheel, shown generally at 14, a carriage 16 for supporting wheel 14, a cantilevering assembly 18 for cantilevering carriage 16, and an anchoring assembly 20 for anchoring assembly 18. Also included is a means for maintaining wheel 14 in an upright position on carriage 16, including a vertically extending pylon 22 and a gimbals unit 24 attached to wheel 14.

Turbine wheel 14 includes a circular rim 26, which in this preferred embodiment is 60 feet in diameter and has a generally flat outer surface which is 9 inches across. Disposed at the center of rim 26 is a hub, shown generally at 28 which is coincident with an axis of rotation 30 about which wheel 14 rotates. Depending radially inwardly from rim 26 are 12 soft airfoils or sails 32 supported by a truss assembly shown generally at 34. Assembly 34 defines 12 pie-shaped sectors 36 symmetrically and uniformly disposed within rim 26 about hub 28. Each sector 36 is defined by radially extending tubular members 40 radiating from hub 28. Associated with each sector 36 is a segment 38 disposed adjacent rim 26. Each segment is defined by rim 26 and a chord member 42 extending between the outer ends of radial members 40, which are connected to rim 26. As shown, particularly in FIGS. 2, 3, wheel 14, and specifically rim 26, is disposed in a vertical plane of rotation 44 which is normal to axis of rotation 30.

Extending along axis 30 from the center of connection of radial members 40 about hub 28 to gimbals unit 24 is a tubular axle 46. Axle 46 is connected to gimbals unit 24 to allow rotation of the axle about axis 30 during rotation of wheel 14.

As particularly shown in FIG. 2, associated with each radial member 40 is a generally planar truss sub-assembly 48, two of which are shown in the figure. It will be noted that FIG. 2 shows a view of the wheel of FIG. 1 rotated 15°, or ½ the angle between radial members 40. Thus, a pair of oppositely directed radial members 40 are shown in the plane of FIG. 2. Associated with each of the two radial members is the truss sub-assembly 48, also disposed in the same plane. Each sub-assembly 48 is formed of several of what will be referred to as truss members which are interconnected to form a stablilizing support for wheel 14, as well as support for sails 32. In this regard, radial members 40 also are included in sub-assemblies 48.

Of particular note are the truss members which extend laterally from rim 26, generally parallel with axis 30, which are referred to as whisker poles 50. As will become more apparent from a discussion of FIGS. 4 and 5, whisker poles 50 are used for supporting the outhaul lines 52 associated with sails 32. Each sail 32 is connected along one edge to a spindle 54 rotatably mounted on an associated radial member 40. Spindle 54 is connected to radial member 40 at a spindle support bearing 56 near to hub 28. Disposed at the opposite end of spindle 54 for rotation with the spindle is a take-up drum 58 which is used, as is conventionally known in soft airfoil wind turbine construction, to take up outhaul line 52 as sail 32 is unfurled. The top of spindle 54 is joined through a spherical bearing (not shown) to a gear reducer assembly 60, as is available from such manufacturers as Euro-Drive or Morse. Assembly 60 is mounted on chord member 42 adjacent to rim 26. Extending along the inside of rim 26 and drivingly connected to reducer assembly 60 is a stepper motor 62. Such motors and associated controllers are generally available, and may be obtained from such companies as Superior Electric Co., Bodine Motor Co., or Sterling Electric Co. During operation, motor 62 is used to rotate spindle 54 for furling and unfurling sail 32.

Figure 4:
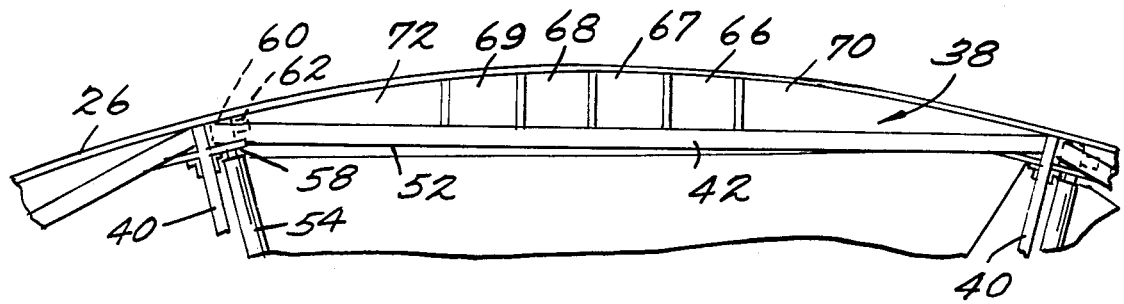
FIG. 4 is an enlarged fragmentary view of a portion of the wind turbine wheel of the wind turbine of FIG. 1 encircled by dashed-dot loop 4.
Figure 5:
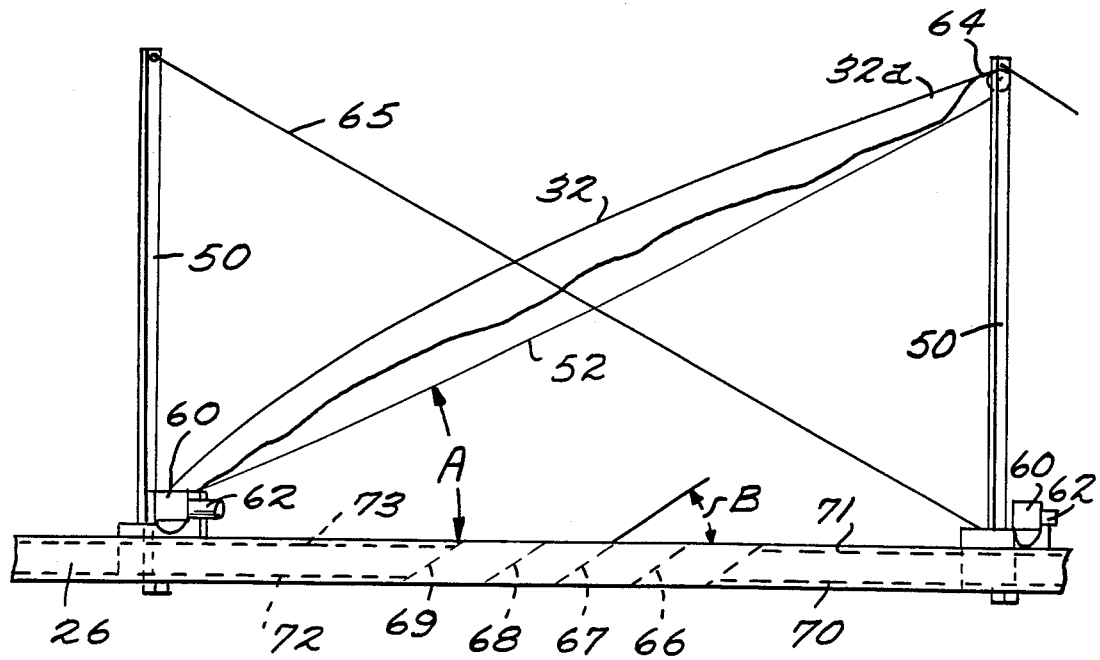
FIG. 5 is a top fragmentary view of the portion of the wind turbine wheel shown in FIG. 4.

Referring now to FIGS. 4, 5, an enlarged view is shown of the outer margin of sail 32 adjacent to rim 26 and segment 38. At the distal end of whisker poles 50 is a pulley 64 around which outhaul line 52 extends. As shown in FIG. 5, outhaul line 52 is connected to the clew 32a of sail 32. It then extends around pulley 64 and back to take-up drum 58 hidden from view by reducer assembly 60. As shown by the angle of outhaul line 52, and therefore the tip of sail 32, the sail is held at an angle A of approximately 28o° from the line of rim 26, and therefore plane 44. A guy wire 65 extends from the tip of pole 50 opposite from out haul line 52 to the base of the next pole 50. Guy wire 65 counteracts the force of line 52 on pole 50.

Directing attention now to FIG. 4, formed in segment 38 are four vanes 66, 67, 68 and 69. These vanes are in the form of plates extending between chord member 42 and rim 26. These vanes are preferably positioned also at an angle B of approximately 28° relative to plane 44. An actual angle of 30° has been found to be easy to construct and is therefore provided in the preferred embodiment.

The remaining areas at the ends of segment 38, as viewed in FIG. 4, are covered by brace plates, including generally parallel brace plates 70, 71, shown at the right end of segment 38 and brace plates 72, 73 shown at the left end. Vanes 66-69 serve as additional airfoils causing rotation of rim 26, which would not otherwise be available from sails 32, since the outer edges of the sails must be formed in a straight line in order to be maintained taut. It has been estimated that the efficiency of wind turbine 10 is increased by approximately 10% as the result of the addition of the vanes. Although, the brace plates could be replaced by additional vanes the improved performance is not sufficient to offset the additional cost of construction.

Extending upwind from the hub of turbine wheel 14 is a nose cone 74. Cone 74 distributes the incoming wind away from hub 28 in a nonturbulent manner so that it is directed into sails 32, thereby also increasing the efficiency of the wind turbine.

Referring again to FIGS. 1-3, and as discussed previously, wheel 14 is supported on carriage 16. Carriage 16 has a generally crescent shaped truss assembly when viewed as shown in FIG. 1. The upper edge of carriage 16 has mounted on it means for taking power from rotating wheel 14. This means is provided in part by a set of six generators distributed along the carriage, as shown. Included are a pair of 50 KW generators 76, 78. These and other generators described herein are available from such companies as Marathon or Dayton. These are each connected by corresponding chains 80, 82 and associated sprocket wheels to power take-off wheels 84, 86. These wheels are generally of a rubber-tire type similar to conventional vehicle tires. It is also desirable to mount the power take-off wheels with brakes, such as electric disc brakes (not shown) of the type available from Twiflex Corp. so that the turbine wheel can be stopped if it rotates at an excessive speed. It is seen that take-off wheels 84, 86 are disposed 30° apart along rim 26. Disposed approximately 15° further along rim 26 from wheels 84, 86 are another pair of wheels 88, 90. Take-off wheels 88, 90 each have associated with them a 40 KW generator 92, 94, respectively, with the wheels and generators being coupled through associated sprocket wheels and gears. Disposed an additional 15° along rim 26, as shown, are power take-off wheels 96, 98. Wheel 96 is drivingly connected to a 20 KW generator 100. Wheel 98 is drivingly connected to a 10 KW generator 102.

Each of these wheel and generator assemblies are mounted on a platform 104 which is pivotly mounted on carriage 16. Connected to an end of platform 104 opposite from wheel 88 is a spring shock adjuster 106. This mounting assembly of the generators allows the power take-off wheels to move radially relative to rim 26 so that slight vibrations and movements in the rim may be absorbed without unduly stressing the power take-off wheels or carriage 16.

Generator 102 provides energy for operating turbine wheel 14. The other five generators produce energy for external use. They provide the capability of producing from 20 to 200 KW through 16 possible combinations of the generators. This arrangement permits adjusting the power output of wind turbine 10 for different wind velocities between approximately 4 and 35 m.p.h. A maximum capacity of 200 KW is realized at wind velocities of approximately between 22 and 25 m.p.h. By energizing different sets of generators, turbine wheel 14 may be operated at a generally and relatively constant 10 revolutions per minute, which correspondingly runs the generators at a peak power speed of 935 revolutions per minute for the particular generators, wheels and associated gearing used in the preferred embodiment. It will be understood that such gearing and operating conditions are a matter of choice depending on the site and desired operating conditions.

It will also be observed that carriage 16 includes an arm 108 extending upwardly from wheel 98 and terminating in a guide wheel 110. Turbine wheel 14 rotates counter-clockwise, as viewed in FIG. 1 and as shown by arrow 112. Because of the frictional connection between the power take-off wheels and rim, there is a tendency for turbine wheel 14 to try to climb out of carriage 16. Guide wheel 110 serves a safety function in that it provides a higher and steeper guide for the rim so that the rim is unable to climb out of carriage 16. This keeps the weight and force of turbine wheel 14 on the various power take-off wheels.

Stepper motors 62 provide concise control of the furling and unfurling of sails 32. A sail 32 is shown in phantom lines which is mostly furled. It can be seen, that in this condition, the sails will provide very little wind resistance. When the wind velocities exceed 35 m.p.h. turbine wheel 14 starts spinning faster than the desired 10 revolutions per minute. The sails are thus furled progressively until approximately a wind velocity of 40 m.p.h., which furling maintains the rotational velocity of turbine wheel 14 at the desired 10 revolutions per minute. At wind speeds beyond 40 m.p.h., the generators are all stopped and the wind turbine closed down, until the wind velocity returns to an acceptable value.

Referring now particularly to FIG. 2 it will be seen that a substantial reinforced concrete foundation 114 is embedded in hill 12. In the preferred embodiment, this foundation is about 10 feet across and 15 feet deep. Securely attached to foundation 114 is a base unit 116 which is used to anchor and support the balance of wind turbine 10. A vertical shaft 118, shown in dashed lines in FIG. 2, extends upwardly from base unit 116. Shaft 118 is integrally joined with and forms a base for pylon 22, described previously.

Disposed around shaft 118 is a sleeve 120 which is freely revolvable around shaft 118. Movement of sleeve 120 is accommodated by a pair of rotary bearings 122, 124. Bearing 124 is hidden by a circular gear rack 126 fixedly attached to and extending around the circumference of bearing 124 and sleeve 120. Shaft 118, base unit 116 and foundation 114 form anchoring assembly 20. Sleeve 120 and bearings 122, 124 can be seen to provide means for revolving cantilevering assembly 18 about anchoring assembly 20. Mounted on base unit 16 is a yaw drive motor 130 which drives a pinion 132, the gear teeth of which mesh with and engage the gear teeth of rack 126. Motor 130 is operable to rotate sleeve 120 about vertical axis 128. Yaw drive motor 130 thus serves as driving means for driving cantilevering assembly 18 about axis of revolution 128.

Another truss, referred to as cantilevering assembly 18, extends generally horizontally from an anchoring portion 18a mounted on sleeve 120 to a supporting portion 18b connected to carriage 16. Thus, carriage 16, and turbine wheel 14 are supported and carried in a cantilevered manner. A stabilizing A-strut 133 exends from the top of pylon 22 to cantilevering assembly 18, as shown.

As yaw motor 132 revolves carriage 16, and therefore turbine wheel 14, about axis 128, there is no contact with the ground except through anchoring assembly 20.

As described previously, mounted on the top of pylon 22 is gimbals unit 24. Included in unit 24 is another rotary bearing 134 which allows wheel 14 to revolve about axis 128 relative to pylon 22. Gimbals unit 24 also includes a pivot mounting 136 which provides for pivoting of axle 46, and therefore wheel 14, about a generally horizontally extending pivot axis 138. In this preferred embodiment, pivot axis 138 intersects axis of rotation 30 and is generally parallel with plan of rotation 44. The gimbals unit further includes another rotary bearing 140 which allows axle 46 to rotate about axis 30. Mounted on the end of axle 46 is an electrical rotary unit 142 which provides for the electrical connection to stepper motors 62. The various bearings described herein are generally available from such companies as Dodge, Fafnier and Rotec.

It will therefore be appreciated that substantially the entire weight of turbine wheel 14 is supported on wheels 84, 86, 88, 90, 96, 98, 110, and therefore carriage 16. The pivoting of turbine wheel 14 on and about axis 138 provides for this. Pylon 22 and gimbals unit 24 then serves as means for maintaining the vertical orientation of turbine wheel 14, but do not support the weight of the turbine. Thus, there is a maximum amount of friction between rim 26 and the power take-off wheels so that a maximum amount of energy may be generated by wind turbine 10.

Mounted on the back of cantilevering assembly 18, opposite from carriage 16 is the power and control unit 144 which is used to provide power generated by the generators contained on turbine 10 to an external power grid. Further, it provides the control units for controlling operation of the stepping motors for furling and unfurling the sails as well as controlling the operation of yaw motor 130 so that turbine wheel 14 may be maintained in an upwind direction generally normal to the direction of wind flow.

Directing attention now to FIG. 6, a block diagram is shown which illustrates the functional operation of yaw motor 130. A conventional wind direction sensor is shown at 146. This sensor is properly placed away from turbine wheel 14 so that it is not affected by the presence of the turbine wheel and yet close enough to provide an indication of the direction of the wind impinging the turbine wheel. Sensor 146 could be used for several closely positioned wind turbines.

Sensor 146 generates a signal on a lead 148 indicative of the wind direction. A controller 150, located in control unit 144, in turn generates a signal on a lead 152 which is sufficient to cause yaw motor 130 to drive carriage 16, and therefore turbine wheel 14, about axis 128 so that it is maintained in a position generally normal to the wind and upwind from pylon 22. In this way, there are no wind shadow effects from the pylon and truss assembly 34 and the airfoils are directly impinged by the wind.

Figure 7:
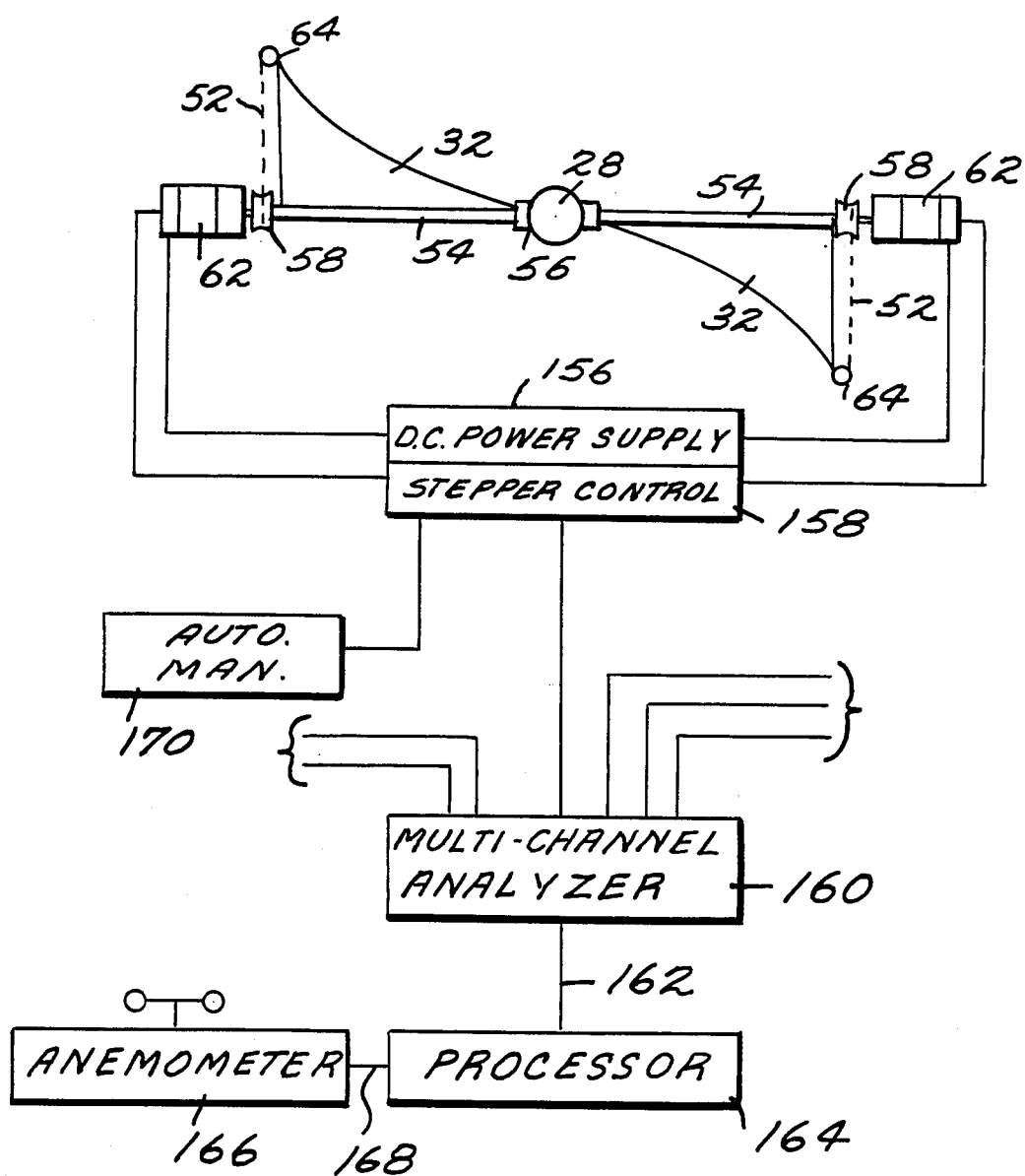
FIG. 7 is a block diagram showing a system for furling and unfurling airfoils on the wind turbine wheel.

Referring now to FIG. 7, stepper motor operation for balanced airfoil furling and unfurling now will be described. A pair of sails 32 disposed at radially opposite positions on turbine wheel 14 are shown mounted on corresponding spindles 54. Outhaul lines 52 are shown extending from the clews of the sails, around pulleys 64 mounted at the end of whisker poles 50 (not shown), to take-up drums 58. Reducer assembly 60 is not shown to simplify the illustration.

Each stepper motor is controllably connected to a DC power supply circuit 156. The operation of the stepper motors, as is well-known, is controlled by a stepper controller 158 which senses the winding resistance through the motor. In the present embodiment, each pair of opposite stepper motors are controlled through a single stepper controller 158. Each pair of motors is controlled in response to wind speed through a multi-channel analyzer 160 which receives instructional signals on a lead 162 from a processor 164 available through such companies as Modicom Corporation. As discussed previously, furling and unfurling of sails 32 is in response to the existing prevalent wind speeds. These wind speeds are determined by an anemometer 166 (which may be part of the same instrument as wind direction sensor 146 described previously) which transmits wind speed information to processor 164 over a lead 168. Further, a switch 170 connected to controller 158 allows for manual override of the automatic operation described previously.

Stepper motors 62 could each be operated individually. However, with the 12-sail construction of the preferred embodiment, it is important that the rotation of turbine wheel 14 be maintained as balanced as possible. That is, if one or more sails were furled differently from others, without compensating furling of others, the turbine wheel would vibrate and bounce around, reducing its overall efficiency and creating undue strain on the various support structures. Opposite sails are therefore operated together. This is accomplished by making sure that each stepper motor furls and unfurls the corresponding opposite sails the same amount.

As an example, if one sail were to break loose from its outhaul line, there would be very little resistance to the motor, with the result that the motor furls that sail until it is completely furled or until a sufficient resistance is obtained. However, in this embodiment, the opposite stepper motor is also operated to the same extent as the one having a loose sail. Both opposite sails are therefore completely furled and the wind turbine continues to rotate in a balanced fashion about axis of rotation 30, albeit at a reduced efficiency, without producing undesirable vibration in the wheel. Wind turbine 10 can thus continue to operate and produce energy until maintenance personnel arrive to repair the cause of the sail failure. It will be appreciated that other combinations of sails also could be appropriately furled to balance the effect of a damaged sail.

It can be seen that a wind turbine constructed according to the present invention, such as the preferred embodiment described previously, provides many advantages over the previously known wind turbine designs. For instance, the cantilevering support for the wind turbine carriage makes the wind turbine constructable on any kind of a terrain which allows the placement of the reinforced concrete foundation, or its equivalent, so long as there is room for the wind turbine to revolve around a sufficient arc so that it may be impinged by the predominant prevailing winds. Thus, if it is known that winds in a certain location of a size sufficient for producing power are from a particular range of directions, or if it is only desired to operate the wind turbine when winds are flowing in a desired range of directions, there is not even need to be sufficient room for the carriage to be revolved 360° about axis of revolution 128. Further, in order to assure the maximum output energy available from the wind turbine, maintaining the wind turbine in an orientation generally normal to the wind without supporting any substantial weight of the turbine wheel is provided by pivoting the turbine wheel about an axis generally normal to the force of gravity. Additionally, by controlling the stepping motors which individually control the furling and unfurling of the airfoils, so that symmetrically opposite stepping motors are operated uniformly, a balanced force is always applied to the turbine wheel so that it may continue to function even if there is a malfunction in a motor or associated airfoil.

While the invention has been particularly shown and described with reference to the foregoing preferred embodiments, it will therefore be understood by those skilled in the art that other changes in form and detail may be made therein without departing from the spirit and scope of the invention as defined in the claims.

What is claimed is:

1. A wind turbine comprising:
   a turbine wheel having a rim and airfoil means depending radially inwardly from said rim for rotating said wheel when subjected to wind;
   carriage means disposed against and supporting said rim for supporting substantially the weight of said wheel;
   means for cantilevering said carriage means, including a supporting portion joined to said carriage means and an anchoring portion spaced generally horizontally from said supporting portion;
   means joined to said anchoring portion for anchoring said cantilevering means relative to the earth at a location spaced generally horizontally from said carriage means; and
   means mounted on said carriage means and coupled to said wheel for taking power from said wheel during rotation.

2. The wind turbine of claim 1 which further includes means joined to said wheel for maintaining said wheel on said carriage means in a manner allowing rotating of said wheel on said carriage and pivoting of said wheel about a generally horizontal axis laterally spaced from said wheel.

3. The wind turbine of claim 2 wherein said wheel rotates about an axis and said axis of pivoting is generally parallel to a plane normal to said axis of rotation.

4. The wind turbine of claim 2 wherein said wheel rotates about an axis and said maintaining means includes a pylon mounted on said anchoring means and extending adjacent said axis of rotation, and means mounted on said pylon and joined to said wheel for allowing pivoting of said wheel relative to said pylon about said axis of pivoting.

5. The turbine of claim 1 wherein said anchoring means includes revolving means for allowing said carriage to revolve about a generally vertical axis spaced from said carriage and wheel.

6. The turbine of claim 5 wherein said anchoring means further includes a stationary shaft extending along said axis of carriage revolution and said revolving means includes a sleeve disposed about said shaft for rotation of said sleeve about said shaft, said cantilevering means being fixedly joined to said sleeve.

7. The turbine of claim 5 which further includes means for driving said cantilever member, and therefore said carriage means, about said axis of revolution.

8. The turbine of claim 7 which further includes wind-direction sensing means for producing a signal indicative of the wind direction, and control means, responsive to the wind-direction indicating signal, for generating a control signal indicative of a predetermined wheel position relative to the sensed wind direction, said driving means being responsive to the control signal for revolving said cantilevering means until said wheel is in the predetermined wheel position 9. The turbine of claim 1 wherein said airfoil means includes a plurality of soft airfoils, and motor means associated with each airfoil for furling and unfurling each airfoil.

10. The turbine of claim 9 wherein each set of airfoils includes symmetrically-opposite airfoils, said turbine further including means for providing power to each motor means in a manner providing uniform furling and unfurling of said opposite airfoils.

11. The turbine of claim 9 wherein said airfoils are disposed in sectors about said hub, and said airfoil means further includes vane means disposed adjacent said rim, in segments associated with said sectors, said vanes being oriented for producing a rotational force on said rim applied by wind consistent with the rotational force applied by such wind on said airfoils.

12. A wind turbine comprising:
   a turbine wheel having a generally circular rim, a plurality of soft airfoils depending radially inwardly from said rim for rotating said wheel when subjected to wind, and motor means associated with each airfoil for furling and unfurling each airfoil;
   means for supporting said turbine wheel during rotation; and
   means coupled to said turbine wheel for taking power from said wheel during rotation.

13. The wind turbine of claim 12 wherein said turbine wheel further includes, for each airfoil, a spindle around which said airfoil is furled and unfurled, and each motor means is mounted on said wheel for rotating the associated spindle.

14. The turbine of claim 12 wherein each set of airfoils includes two symmetrically-opposite airfoils, said turbine further including means for providing power to each motor means in a manner providing uniform furling and unfurling of said opposite airfoils.

15. The turbine of claim 12 wherein said airfoils are disposed in sectors about said hub, and said turbine wheel further includes vane means disposed adjacent said rim, in segments associated with said sectors, said vanes being oriented for producing a rotational force on said rim applied by wind consistent with the rotational force applied by such wind on said airfoils.

16. A wind turbine comprising:
   a turbine wheel having a generally circular, vertically disposed rim, a hub disposed at the center of said rim, and soft airfoil means depending radially inwardly from said rim for rotating said wheel about an axis when subjected to wind, including motor means associated with each of said airfoil means for furling and unfurling said airfoil means;
   carriage means disposed below and supporting said rim for supporting substantially the weight of said wheel;
   means for cantilevering said carriage means, including a supporting portion joined to said carriage means and an anchoring portion extending generally horizontally from said supporting portion and laterally relative to said wheel;
   means for anchoring said cantilevering means relative to the earth at a location spaced generally horizontally from said carraige means, including a generally vertically extending shaft, a sleeve rotatably mounted on said shaft and fixedly joined to said anchoring portion of said cantilevering means, and drive means for revolving said sleeve, and therefore said carriage, about a generally vertical axis;
   wind-direction sensing means for producing a signal indicative of the wind direction;
   control means, responsive to the wind-direction indicating signal, for generating a control signal indicative of a predetermined wheel position generally normal to the sensed wind direction and upwind from said axis of revolution, said drive means being responsive to the control signal for revolving said cantilevering means until said wheel is in the predetermined wheel position;
   a pylon extending upwardly along said axis of revolution and supported on said anchoring means;
   an axle fixedly joined at one end to said wheel hub, extending along said axis of rotation of said wheel, and joined at the other end to said pylon in a manner allowing rotation of said axle, and therefore said wheel, about said axis of rotation relative to said pylon, allowing pivoting of said axle along a generally horizontal axis normal to said axis of rotation, and allowing revolving of said axle relative to said pylon about said axis of revolution.

* * * * *